United States Patent [19]

Echols et al.

[11] 4,344,728

[45] Aug. 17, 1982

[54] ROLLING RACK CONTROL MEANS

[75] Inventors: James M. Echols, Selma; Richard W. Bouwhuis, Reedley, both of Calif.

[73] Assignee: Sperry Corporation, New Holland, Pa.

[21] Appl. No.: 181,927

[22] Filed: Aug. 27, 1980

[51] Int. Cl.³ .................... A01D 87/12; B65G 57/32
[52] U.S. Cl. ......................................... 414/39; 414/44
[58] Field of Search ................. 414/38, 39, 40, 44, 414/477, 491, 492, 521

[56] References Cited

U.S. PATENT DOCUMENTS

| | | | |
|---|---|---|---|
| 2,848,127 | 8/1958 | Grey | 414/39 |
| 3,502,229 | 3/1970 | Butler | 414/39 |
| 3,502,230 | 3/1970 | Grey et al. | 414/37 |
| 3,945,507 | 3/1976 | Olsen et al. | 414/40 |
| 4,212,578 | 7/1980 | Butler | 414/39 |

*Primary Examiner*—Leslie J. Paperner
*Attorney, Agent, or Firm*—Larry W. Miller; Frank A. Seemar

[57] ABSTRACT

An automatic bale wagon is disclosed wherein a rolling rack control mechanism is mounted to the frame and cooperable with the load bed or third table and the actuator of the rolling rack which is movable between a first position and a second position so that when the third table is in the first loading position, the control mechanism is in the first position and when the third table is in the second unloading position, the control mechanism is in the second position, which causes the actuator to automatically move the rolling rack fully to the rear end of the third table before the stack of bales is unloaded.

10 Claims, 4 Drawing Figures

ROLLING RACK CONTROL MEANS

BACKGROUND OF THE INVENTION

This invention relates generally to bale wagons, and specifically to apparatus for use on a bale wagon to insure that the rolling rack which holds the stack of bales on the load bed is automatically moved to the fully rearward position during the stack unloading process.

It is accepted present day practice to form bales of crop materials such as hay or the like into stacks through the employment of an automatic bale wagon. One type of bale wagon which has achieved widespread commercial acceptance is the automatic bale wagon which employs the three table concept, as originally illustrated and described in U.S. Pat. No. 2,848,172 which issued to Gordon E. Grey. Many refinements have been made to the Grey bale wagon, such as those shown in U.S. Pat. No. 3,945,507. However, the basic concept has remained substantially the same.

This type of bale wagon includes a first table which successively receives bales from a bale loader or pickup on the wagon frame and accumulates a predetermined number of bales, for example, two being arranged end-to-end in a row. The Grey bale wagon also includes a second table which successively receives the accumulated predetermined number of bales from the first table and accumulates them in a plurality of rows, such as four, five or six rows, the plurality of rows commonly being known as a tier of bales. The third table or load bed then successively receives the tiers from the second table and accumulates a plurality of the tiers, for example seven, to form a stack. Once the stack has been accumulated on the load bed or third table, it may be unloaded by pivoting the load bed 90 degrees and depositing the stack on the ground with the first tier of bales which was previously accumulated on the second table now being the lowermost tier of the stack in contact with the ground surface.

Another type of bale wagon, which is generally shown and described in U.S. Pat. No. 4,212,578, employs a stationary bale-receiving area which roughly corresponds to the pivotable first table area of the Grey-type wagon discussed above. The bale-receiving area and bale-accumulating table are substantially at the same level, and the bales are transferred therebetween by a pusher mechanism in front of the bale-receiving area which engages the bales and displaces them rearwardly onto the forward portion of the bale-accumulating table. The second and third tables then function substantially as described in the Grey patent, and generally known in the art.

Any bale wagon which employs a pivoting bale-accumulating table to deposit a tier of bales on a load bed encounters significant tier stability problems when operating, especially under hilly conditions. To support the stack on the load bed or third table, a rolling rack has been provided which moves rearwardly as each additional tier of the stack is deposited on the load bed until it is fully formed. This rolling rack then supports the stack of bales as the third table is pivoted through 90 degrees about a transverse axis to deposit the bales on the ground. The rolling rack thus is called upon to support the entire weight of the stack, frequently as much as four tons, until the third table has completed its pivoting maneuver and deposited the bales against the ground. If the rolling rack is not at the fully rearward position at the back edge of the third table, this considerable mass which the rolling rack must support can damage the rolling rack by causing it to twist or fail, especially in units utilizing hydraulics to move the rolling rack along the length of the third table. Recognizing this problem, designers have incorporated supports at the back edge of the third table to reinforce the rolling rack during the unloading operation. However, this still requires that the rolling rack be moved to its fully rearward position before the unloading process is begun. Since the rolling rack is moved rearwardly by the pressure of the tier being transferred from the second table to the third table, it is entirely possible when a stack is fully forced that a gap of five or six inches exists between the rolling rack and the back edge of the third table. This space is sufficient when the rolling rack is subjected to the mass of a stack of bales during the unloading, to permit the rack to fail or become twisted. Machines heretofore utilizing hydraulics to move the rolling rack require the operator to manually perform a function which moves the rolling rack to the fully rearward position. Frequently, the operator will neglect to perform this manual operation, resulting in the aforementioned damage to the rolling rack during unloading of the stack of bales.

The foregoing problems are solved in the design of the rolling rack control means comprising the present invention by providing in an automatic bale wagon a control means which is mounted to the frame and cooperable with the third table and the actuator of the rolling rack which is movable between a first position and a second position so that when the third table is in the first loading position the control means is in the first position and when the third table is in the second unloading position the control means is in the second position which causes the actuator to automatically move the rolling rack fully to the rear end of the third table before the stack of bales is unloaded.

BRIEF DESCRIPTION OF THE DRAWINGS

The features and advantages of this invention will become apparent upon consideration of the following detailed description of the disclosure of the invention, especially when it is taken in conjunction with the accompany drawings wherein.

SUMMARY OF THE INVENTION

It is a principal object of the present invention to provide in an automatic bale wagon utilizing a load bed with a rolling rack control apparatus for the rolling rack that automatically controls the movement of the rolling rack between a fully forward position and a fully rearward position dependent upon positioning of the load bed during operation.

It is another object of the present invention to provide in an automatic bale wagon a control apparatus which automatically performs a function during the operation of the machine which otherwise must be done manually by the operator.

It is a further object of the present invention to provide in an automatic bale wagon control apparatus which simplifies the operation of the unit for the operator.

It is a feature of the present invention that the control apparatus includes a spring biased lever connected to a hydraulic fluid flow control valve which is positioned by the lever during the unloading of the stack so that the hydraulic circuit automatically causes the rolling rack to be moved to the fully rearward position on the load bed when the load bed is raised to the stack unloading position.

It is another feature of this invention that when the load bed is lowered the spring biased lever is engaged by the load bed and moved to a second position which allows the flow control valve to be positioned to enable the rolling rack to automatically be moved to the front of the load bed.

It is an advantage of the present invention that damage to the rolling rack is prevented from excessive loading to which the rolling rack may be subjected because the rolling rack is not properly positioned fully to the rear of the load bed.

It is a further advantage of the present invention that the operation of the automatic bale wagon is simplified.

It is another advantage of the present invention that the control of the rolling rack during stacking operations of the automatic bale wagon is improved.

These and other objects, features and advantages are obtained by providing in an automatic bale wagon a rolling rack control means which is mounted to the frame and cooperable with the load bed or third table and the actuator of the rolling rack which is movable between a first position and a second position so that when the third table is in the first loading position the control means is in the first position and when the third table is in the second unloading position the control means is in the second position which causes the actuator to automatically move the rolling rack fully to the rear end of the third table before the stack of bales is unloaded.

DETAILED DESCRIPTION OF THE PREFERRED EMBODIMENT

Figure 1:
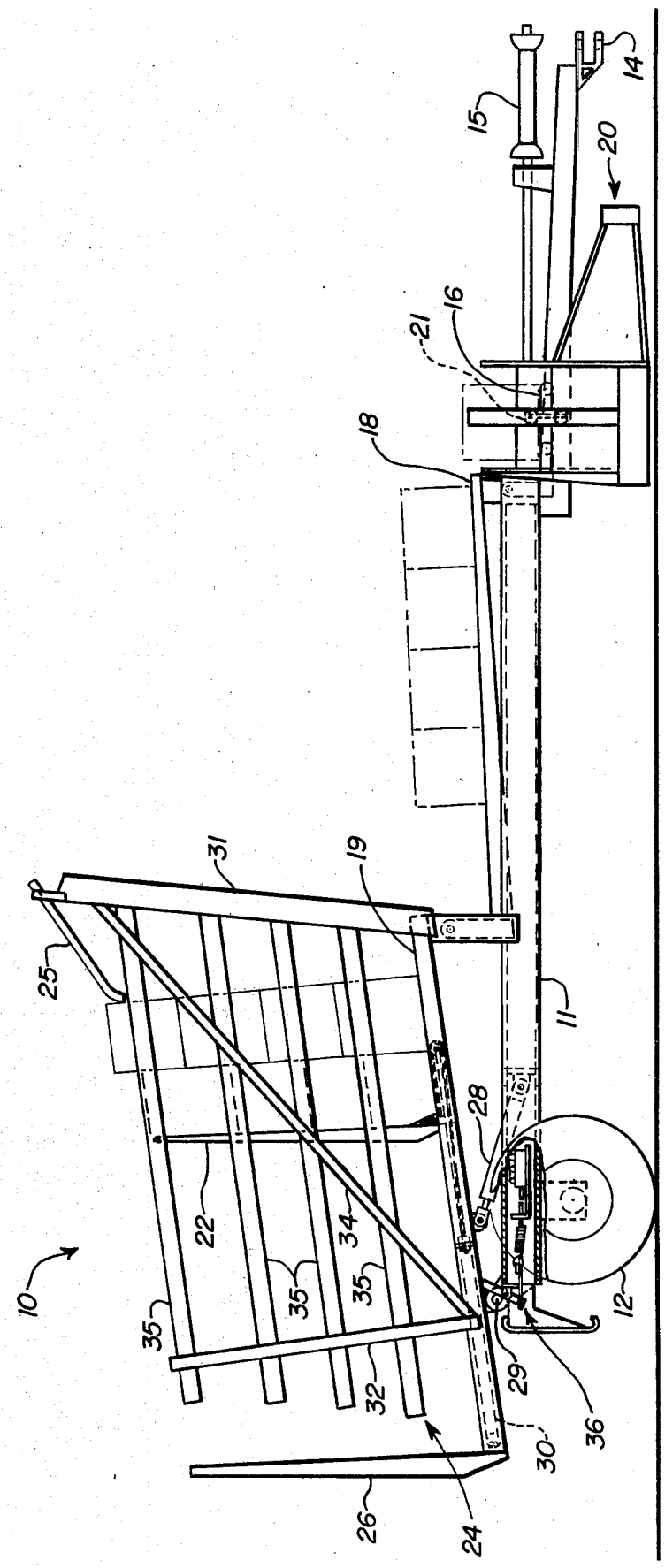
FIG. 1 is a side elevational view of a bale wagon with a portion cut away to show the control apparatus of the present invention.

Referring to FIG. 1 there is shown a bale wagon indicated generally by the numeral 10 on which the instant invention is employed. The bale wagon comprises a main frame 11 supported rearwardly by an opposing pair of wheels 12, only one of which is shown, and extending forwardly to a hitch 14 by which the wagon may be attached to a tractor or towing vehicle. A power take-off 15 may be affixed to the towing vehicle and used to supply the rotary power that will power the various working components of the bale wagon. Alternatively, the bale wagon may be of the self-propelled type, as readily found in the prior art. Specific operating characteristics of the bale wagon are not generally important to the invention to be described; however the bale wagon shown employs a first table 16 for receiving bales thereon which is spaced forwardly of a second table 18 to accumulate bales to form a tier, which is in turn spaced forwardly of a third table or load bed 19 on which a stack of bales is formed from the individual tiers.

As the bale wagon moves through a field, bales are engaged by a conventional pick-up 20 and deposited on the first table 16 across which they are moved by a conventional cross conveyor 21. After a predetermined number of bales, usually two, are positioned on the first table, a pivoting mechanism (not shown) engages the bales and pivots them upwardly onto the second table. Under certain circumstances, it is beneficial to turn the bale on the flat, and therefore a turning device (not shown) could also be provided. The specific operation of the first table 16 does not form a part of this invention; however, alternatively a pusher type of mechanism such as that shown and described in U.S. Pat. No. 4,212,578 could be also employed.

The process of transferring bales onto the second table 18 is repeated until the table is filled with a tier of bales in any one of a number of forms. At that time, the second table is pivoted upwardly and rearwardly toward the third table 19 so that the tier engages the rolling rack 22 and is held between the side rails 24, each of which are positioned along opposing sides of the third table 19. Both side rails 24 and a plurality of bale engaging fingers 25, positioned across the width of the third table 19, engage the tiers as they form a stack and add stability to the stack. The entire process is repeated serially until the load bed or third table is filled with a stack of bales. Then, the third table 19 is pivoted upwardly and rearwardly and the bales are deposited on the ground in the form of a stable stack. At least a pair of end fingers 26 projecting upwardly from the third table 19 add to the stability of the stack as it is formed and off-loaded. A pair of hydraulic cylinders 28, only one of which is shown, serves to pivot the third table 19 about a horizontal axis coinciding with the shaft 29, to which the third table 19 is appropriately hinged. The rolling rack 22 is moved forwardly and backwardly by means of a single hydraulic cylinder 30, which is positioned about midway between the sides of the third table. Further stability is added to the stack by the nature of the side rails 24 which include a front upwardly raising brace 31, a rear upwardly raising supporting beam 32, the brace 31 and the supporting beam 32 being interconnected by a diagonal number 34 and a plurality of generally fore-and-aft extending beams 35.

Figure 2:
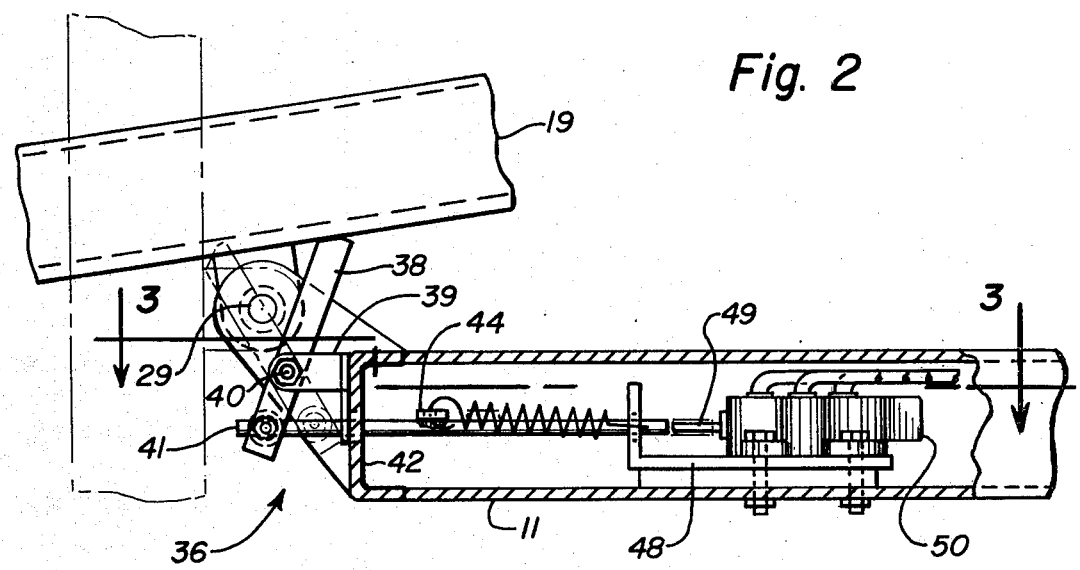
FIG. 2 is an enlarged side elevational view of the control apparatus of the present invention.

An automatic control means for the movement of the rolling rack is indicated generally in FIG. 1 by the numeral 36. As best seen in enlarged scale in FIGS. 2 and 3, the control apparatus comprises a pivotally mounted lever 38 which is supported for pivotal movement by bracket 39, which is suitably fastened to frame 11. Lever 38 pivots about point 40 and is appropriately fastened to a rod 41 at its lower end. Rod 41 extends through an appropriately sized apperture in the rear vertical portion 42 of main frame 11. The rod 41 has a plate 44 appropriately fastened thereto, such as by welding. A pair of biasing springs 45 and 46 are secured to appertures in the plate 44 and on their opposite end to an L-shaped retaining bracket 48. Bracket 48 is appropriately fastened to the main frame 11, such as by bolts. The rod 41 is positioned for longitudinal or fore-and-aft movement and is cooperative with the plunger 49 of the hydraulic control valve 50. Control valve 50 is of the type commonly available from several commercial suppliers, such as Cessna Aircraft Corporation's Hydraulic Division as Control Valve Part No. 30511-AAR.

In this type of a control valve the spool (not shown) within the valve is spring loaded to the center position. As incorporated in the hydraulics of the instant bale wagon, this positioning normally occurs when the third table 19 is in the down or loading position, permitting the hydraulic fluid to go from the third table cylinders 28 and the rolling rack cylinder 30 back to the reservoir. This permits the rolling rack in the pressurized hydraulic system to be pushed rearwardly one tier at a time by the force of the tier of bales being transferred from the second table 18 to the third table 19. It is this rearward movement which forces the hydraulic fluid out of the rolling rack cylinder 30 and back to the reservoir, best seen in the diagrammatic illustration of FIG. 4.

Figure 3:
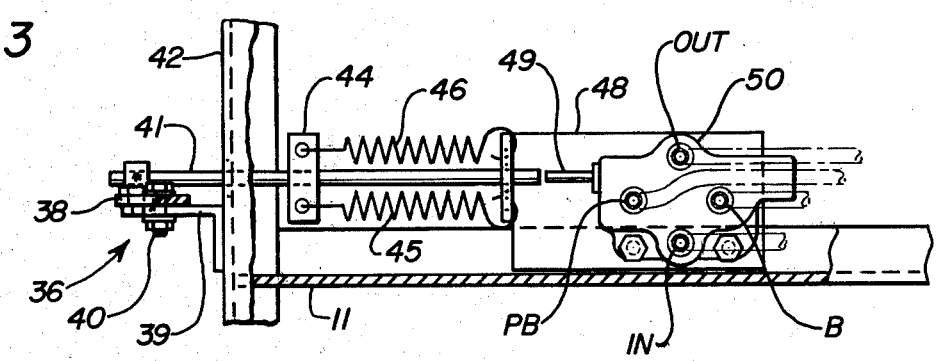
FIG. 3 is a sectional view taken along the lines 3—3 of FIG. 2.

In the bale loading position the bottom of the third table 19 engages the lever 38 in such a way as to keep the rod 41 pivoted rearwardly so that it does not contact the plunger 49, see FIG. 3. This permits the spring loaded spool of control valve 50 to remain in the aforementioned center position. However, when the third table is pivoted upwardly to unload a stack of bales, the bottom of the third table 19 moves upwardly permitting the lever 38 to also move upwardly, thereby forcing the rod 41 forwardly into contact with the plunger 49. This moves the spool within the valve 50 so that fluid automatically flows out of the rolling rack cylinder 30 back to the reservoir to permit the weight of the stack to move the rolling rack to the fully rearward position where it is appropriately seated so that the load is distributed between the rolling rack 22 and end fingers 26. In this type of a hydraulic circuit the bale wagon 10 may incorporate a single bale unloading capability, permitting the hydraulic cylinder 30 for the rolling rack 22 to move the stack forwardly one tier at a time. Such an operation requires that the flow of hydraulic fluid be reversed. This is accomplished by means of the rolling rack control valve illustrated in FIG. 4 so that the spool is positioned in the center position of valve 50, permitting the hydraulic fluid to pass through the port PB to the rolling rack cylinder 30.

Figure 4:
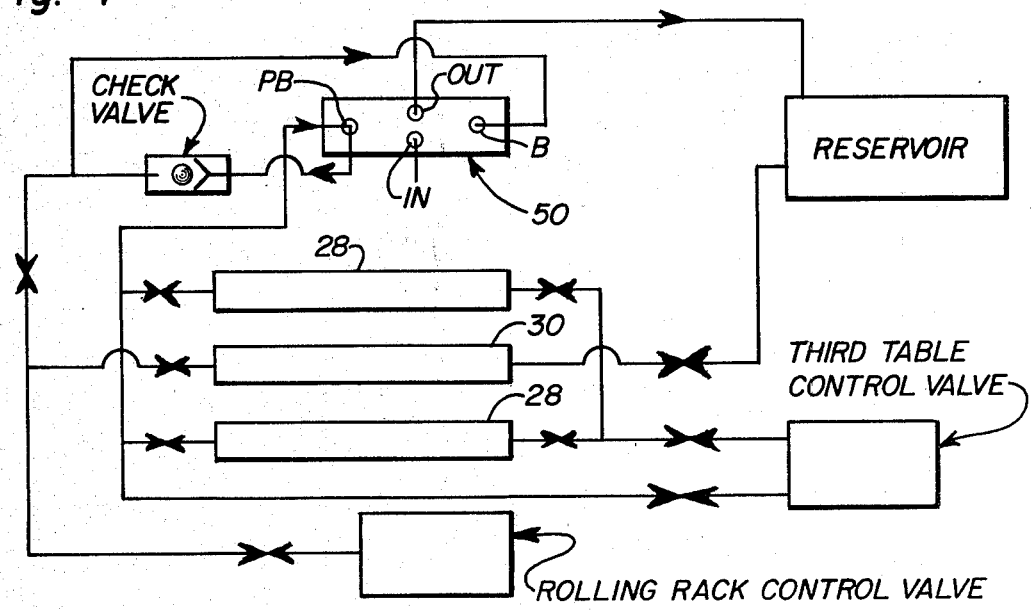
FIG. 4 is a diagrammatic illustration of the fluid circuit diagram within which the control apparatus of the present invention is utilized.

When it is desired to transfer the third table 19, from the stack unloading position, back to the loading position shown in FIG. 1, the third table control valve of FIG. 4 is activated to permit the third table cylinders 28 to retract. In this type of a flow path the hydraulic fluid enters the inport and exits the PB port of the control valve 50. When the third table 19 is lowered to the fully horizontal or loading position, the control means 36 has the lever 38 engaged, by the bottom of the third table pivoting the rod 41 out of contact with the plunger 49. During the loading process the pilot operated check valve shown in FIG. 4 cooperates with the second table so when the second table returns to the bale receiving position the check valve is shut. While the check valve is open the hydraulic fluid can flow back to the reservoir to permit the rolling rack to be moved from rearwardly one tier at a time in the manner previously described due to the force of the tier of bales being pressed thereagainst by the second table. Since this check valve remains closed during the bale stack unloading process because the second table is not utilized, unless the rolling rack control means 36 were provided the rolling rack would remain in a position somewhat forwardly of the fully rear end position during unloading of the stack. This could cause the aforementioned damage to the rolling rack to occur by having the full weight of the stack, often as much as 4 tons, be supported by the rolling rack 22. The control means 36, however, provides as herein described the mechanism which automatically permits the rolling rack to be moved to the fully rearward position during the stack unloading process to prevent damage from occurring to the rolling rack 22.

Thus there is provided a control apparatus 36 which cooperates with the existing hydraulic circuitry on an automatic bale wagon to ensure that the rolling rack 22 is not damaged during the stack unloading process and which removes from the control of the operator a previously manual function.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangements of parts which will occur to one of ordinary skill in the art upon a reading of this disclosure.

Having thus described the invention, what is claimed is:

1. In a bale wagon having a mobile frame with pick-up means mounted to the frame to pick up bales of crop material from a field and transfer them to a first bale receiving table, a second table mounted to the frame rearwardly of the first table to receive bales from the first table to form a tier of bales, a third table pivotally mounted to the frame rearwardly of the second table of predetermined length having a front end and a rear end to receive the tier of bales from the second table and form a stack, the third table being movable between a first loading position and a second unloading position, and stack supporting means movable by actuator means along the predetermined length of the third table as the stack is formed, the improvement comprising:

control means mounted to the frame and cooperable with the third table and the actuator means of the stack supporting means, said control means being movable between a first position and a second position such that when the third table is in the first loading position the control means is in the first position, the movement of the third table to the second unloading position causing the control means to move to the second position which in turn causes the actuator means to effect a movement of the stack supporting means fully to the rear end of the third table before the stack of bales is unloaded.

2. The apparatus according to claim 1 wherein when the third table is returned to the first loading position the control means returns to the first position thereby causing the actuator means to return the stack supporting means to the front end of the third table.

3. The apparatus according to claim 2 wherein the actuator means is a hydraulic cylinder connected to a hydraulic circuit.

4. The apparatus according to claim 3 wherein the control means further comprises a pivotable spring biased lever contactable with the third table and connected to a hydraulic flow control valve connected to the circuit so that when the third table is in the second unloading position the flow control valve is positioned so that the hydraulic cylinder permits the stack supporting means to selectively be moved to the rear end of the third table.

5. The apparatus according to claim 4 wherein when the third table is in the first loading position, the third table contacts a pivotable lever so that it positions the flow control valve so that the hydraulic cylinder is activated to move the stack supporting means to the front end of the third table.

6. In a bale wagon with a mobile frame for moving across a field of crop material to retrieve performed bales of crop material, the combination having:
   (a) pick-up means mounted to the frame to pick up the bales of crop material from the field and convey them upwardly;
   (b) a first table for receiving the bales from the pick-up means;
   (c) a second table rearwardly of the first table for forming a tier several bales high from the bales received from the first table;
   (d) means to convey the bales from the first table to the second table;
   (e) a third table of predetermined length having a front end and a rear end to receive the tier of bales from the second table to form a stack, the third table being movable between a first loading position and a second unloading position;
   (f) power means fastened to the frame and connected to the third table effective to move the third table between the first loading position and the second unloading position;
   (g) means to transfer the tier of bales from the second table to the third table;
   (h) stack supporting means movable along the predetermined length of the third table from the front end of the rear end to support the stack as it is formed tier by tier on a third table;
   (i) actuator means to move the stack supporting means along the third table; and
   (j) control means movable between a first position and a second position and cooperable with the third table and the actuator means, the control means being movable in response to the movement of the third table such that the control means is in a first position when the third table is in the loading position and in a second position when the third table moves to the unloading position, so that when the control means moves to the second position, the actuator means is activated by the control means to move the stack supporting means to the fully rear end position and thereafter as the third table returns to the loading position the control means returns to the first position, causing the actuator means to move the stack supporting means to the fully front end position.

7. The apparatus according to claim 6 wherein the actuator means comprises at least one hydraulic cylinder connected to a hydraulic circuit.

8. The apparatus according to claim 7 wherein the power means comprises at least one hydraulic cylinder connected to the hydraulic circuit.

9. The apparatus according to claim 8 wherein the control means further comprises a pivotable spring biased lever contactable with the third table and connected to a hydraulic flow control valve connected to the circuit so that when the third table is in the second unloading position the flow control valve is positioned so that the hydraulic circuit is activated to move the stack supporting means to the rear end of the third table.

10. The apparatus according to claim 9 wherein when the third table is in the first loading position the third table contacts the pivotable lever so that it positions the flow control valve so that the hydraulic cylinder is activated to move the stack supporting means to the front of the third table.

* * * * *